(12) United States Patent
Genta et al.

(10) Patent No.: US 8,527,743 B2
(45) Date of Patent: Sep. 3, 2013

(54) SIMULTANEOUS CHECKING OF PLURAL EXIT CONDITIONS LOADED IN TABLE SUBSEQUENT TO EXECUTION OF WAIT INSTRUCTION FOR JITTER FREE EXIT

(75) Inventors: Claudio Genta, Orbassano (IT); Alberto Manzone, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 580 days.

(21) Appl. No.: 12/848,876

(22) Filed: Aug. 2, 2010

(65) Prior Publication Data
US 2011/0197050 A1   Aug. 11, 2011

(30) Foreign Application Priority Data
Aug. 3, 2009   (EP) .................................... 09425317

(51) Int. Cl.
*G06F 9/32* (2006.01)
(52) U.S. Cl.
USPC ....... 712/234; 712/241; 712/244; 712/E9.077
(58) Field of Classification Search
None
See application file for complete search history.

(56) References Cited

U.S. PATENT DOCUMENTS 4,409,653 A    10/1983  Bruce, Jr.
7,388,588 B2 *  6/2008  D'Amora et al. ............. 345/567

FOREIGN PATENT DOCUMENTS
WO    WO 03/058447    7/2003
WO    WO 2008/110804  9/2008

* cited by examiner

*Primary Examiner* — Kenneth Kim
(74) *Attorney, Agent, or Firm* — Woodcock Washburn LLP

(57) ABSTRACT

A microprogrammable electronic device comprises a code memory storing a plurality of instructions. At least one instruction, when executed by the device, causes the device to enter into a wait state associated with a plurality of predefined wait state exit conditions. The device is configured to load into an electronic table each condition together with a corresponding code memory address of an instruction to be executed when the condition occurs; to execute, when is in the wait state, a wait instruction stored in the code memory and which, when executed, is such as to cause the device to check simultaneously the conditions loaded into said electronic table to detect if condition occurs; and, if a condition occurs, to exit from said wait state and to execute the instruction stored in the code memory at the code memory address loaded into the electronic table together with the condition that occurred.

8 Claims, 5 Drawing Sheets

SIMULTANEOUS CHECKING OF PLURAL EXIT CONDITIONS LOADED IN TABLE SUBSEQUENT TO EXECUTION OF WAIT INSTRUCTION FOR JITTER FREE EXIT

CROSS-REFERENCE TO RELATED APPLICATIONS

This application claims priority to European Patent Application No. 09425317.6, filed on Aug. 3, 2009, the contents of which is incorporated by reference herein in its entirety.

TECHNICAL FIELD

The present invention relates to the implementation of wait states in a microprogrammable device.

BACKGROUND

As is known, a microprogrammable device is an electronic device comprising: a processor; a code memory storing a software and/or firmware code comprising a set of instructions to be executed; and a data memory storing values of variables employed in executing the code.

More specifically, when operating, the microprogrammable device executes the code, i.e. the instructions, stored in the code memory.

When executing the code, the microprogrammable device may often find itself in a wait state with a number of possible exits, each depending on the occurrence of a respective condition.

One example of a wait state in which a microprogrammable device remains with constant exits for a certain length of time is represented by the on and off phases of a chopper operation.

More specifically, the microprogrammable device may "exit" the on (or off) phase when it detects, for example, one of the following conditions: a current or time limit is reached and it is necessary to switch to the complementary off (or on) phase; a time limit is reached and it is necessary to change macrophase; or a control pin of the microprogrammable device changes state and it is necessary to interrupt execution of the chopper operation.

To exit the wait state, the microprogrammable device therefore cyclically and continuously checks each individual condition.

More specifically, once the microprogrammable device has detected a given condition, it executes an instruction corresponding to that given condition.

In other words, execution of the code is "directed" according to the condition detected by the microprogrammable device.

In known microprogrammable devices, wait states of the above type are implemented by continuously and cyclically executing a set of instructions, each designed to check a corresponding condition.

By way of example, FIG. 1 shows a flow chart of an instruction execution logic of a known microprogrammable device in the case of a three-exit wait state.

More specifically, the instruction execution logic, indicated by 10 in the FIG. 1, comprises executing: a first instruction 11; a second instruction 12, after the execution of which the microprogrammable device enters into a wait state; a first check 13 of a first wait state exit condition; a third instruction 19, if the first wait state exit condition has been detected during the first check 13; a second check 14 of a second wait state exit condition, if the first wait state exit condition has not been detected during the first check 13; a fourth instruction 18, if the second wait state exit condition has been detected during the second check 14; a third check 15 of a third wait state exit condition, if the second wait state exit condition has not been detected during the second check 14; and a fifth instruction 17, if the third wait state exit condition has been detected during the third check 15.

Moreover, as shown in FIG. 1, if the third wait state exit condition has not been detected during the third check 15, the instruction execution logic 10 comprises repeating 16 the first check 13.

In known microprogrammable devices, each instruction is executed in a corresponding instruction cycle.

Moreover, each time an instruction is executed, a program counter, indicating the code memory address of the next instruction to be executed, is updated.

For example, in the FIG. 1 case, if during the first check 13 the first wait state exit condition is detected, the program counter is updated so as to address the third instruction 19 as the next one to be executed. Conversely, the program counter is updated so as to address the second check 14.

The Applicant, however, has observed that, in known wait state implementations, the time interval between the occurrence of a condition and execution of the corresponding instruction varies, i.e. is affected by a sort of jitter.

The length of the time interval, in fact, depends on the point at which the execution of the code is when the condition occurs.

For a clearer understanding of the problem, FIG. 2 shows three examples, indicated by 21, 22 and 23, respectively, of instructions executed in accordance with the instruction execution logic 10 in FIG. 1.

In detail, in the first example 21, the second wait state exit condition occurs simultaneously with an execution of the second check 14, so is therefore detected immediately, and the fourth instruction 18 is executed at the next instruction cycle.

In the first example 21, the time interval between occurrence of the second wait state exit condition and execution of the corresponding instruction, i.e. the fourth instruction 18, is therefore of one instruction cycle.

In the second example 22, on the other hand, the second wait state exit condition occurs simultaneously with an execution of the first check 13, so is therefore detected at the following instruction cycle when the second check 14 is executed, while the fourth instruction 18 is executed yet another instruction cycle later.

In the second example 22, the time interval between occurrence of the second wait state exit condition and execution of the fourth instruction 18 is therefore of two instruction cycles.

Finally, in the third example 23, the second wait state exit condition occurs simultaneously with an execution of the third check 15, so is therefore detected after three instruction cycles when the second check 14 is again executed, while the fourth instruction 18 is executed yet another instruction cycle later.

In the third example 23, the time interval between occurrence of the second condition and execution of the fourth instruction 18, is therefore of four instruction cycles.

Therefore, as stated, and as shown in the examples 21, 22 and 23, the time interval between occurrence of a wait state exit condition and execution of the corresponding instruction does not have a fixed length, i.e. is affected by jitter.

SUMMARY

The objective of present invention is then to provide a microprogrammable device which can alleviate the above cited drawback.

This objective is achieved by the present invention in that it relates to a microprogrammable electronic device, as claimed in the attached claims.

BRIEF DESCRIPTION OF THE DRAWINGS

For a better understanding of the present invention, a preferred embodiment, which is intended purely by way of example and is not to be construed as limiting, will now be described with reference to the attached drawings (all not to scale), wherein.

DETAILED DESCRIPTION OF ILLUSTRATIVE EMBODIMENTS

Figure 1:
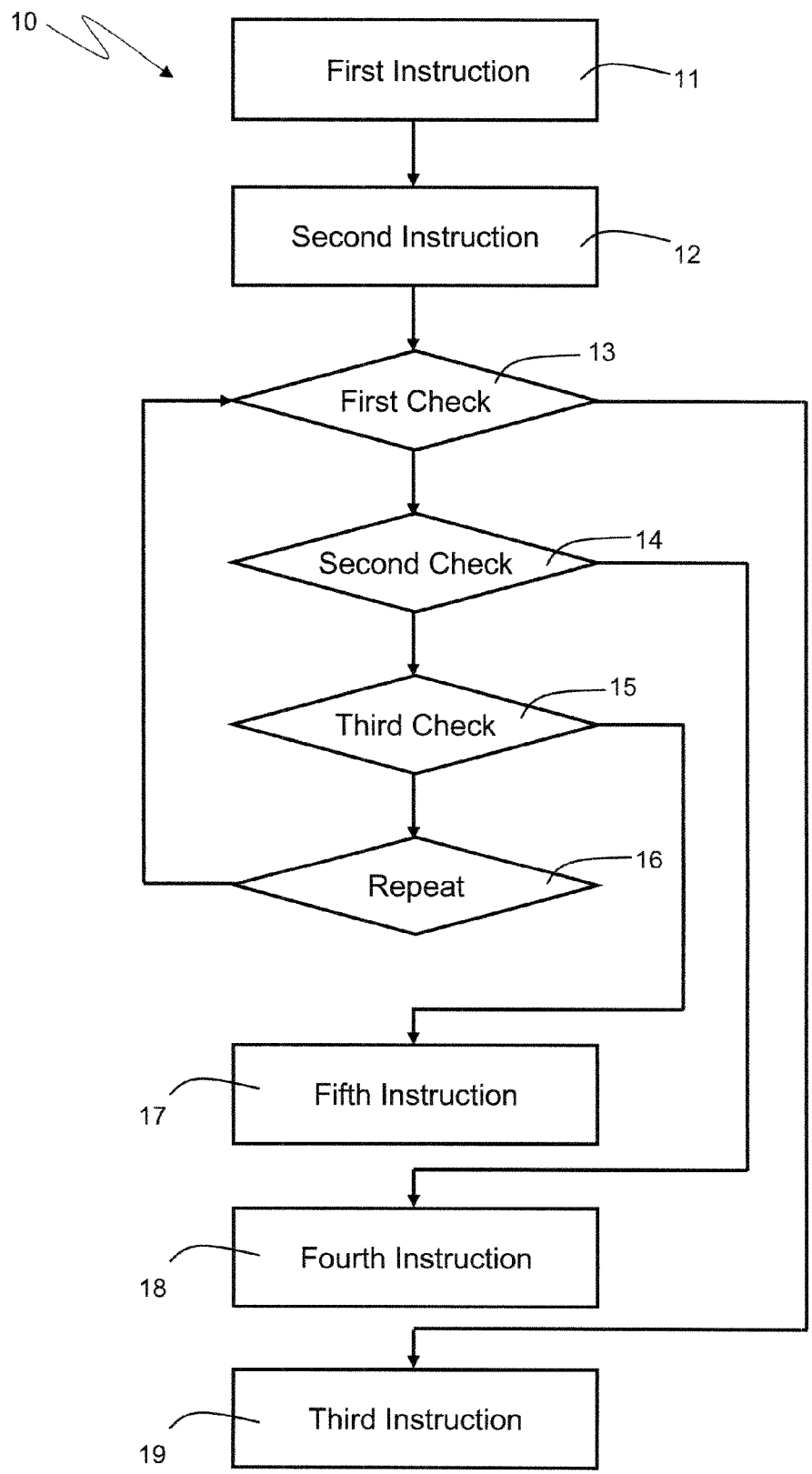
FIG. 1 shows a flow chart of an instruction execution logic of a known microprogrammable device in the case of a three-exit wait state.
Figure 2:
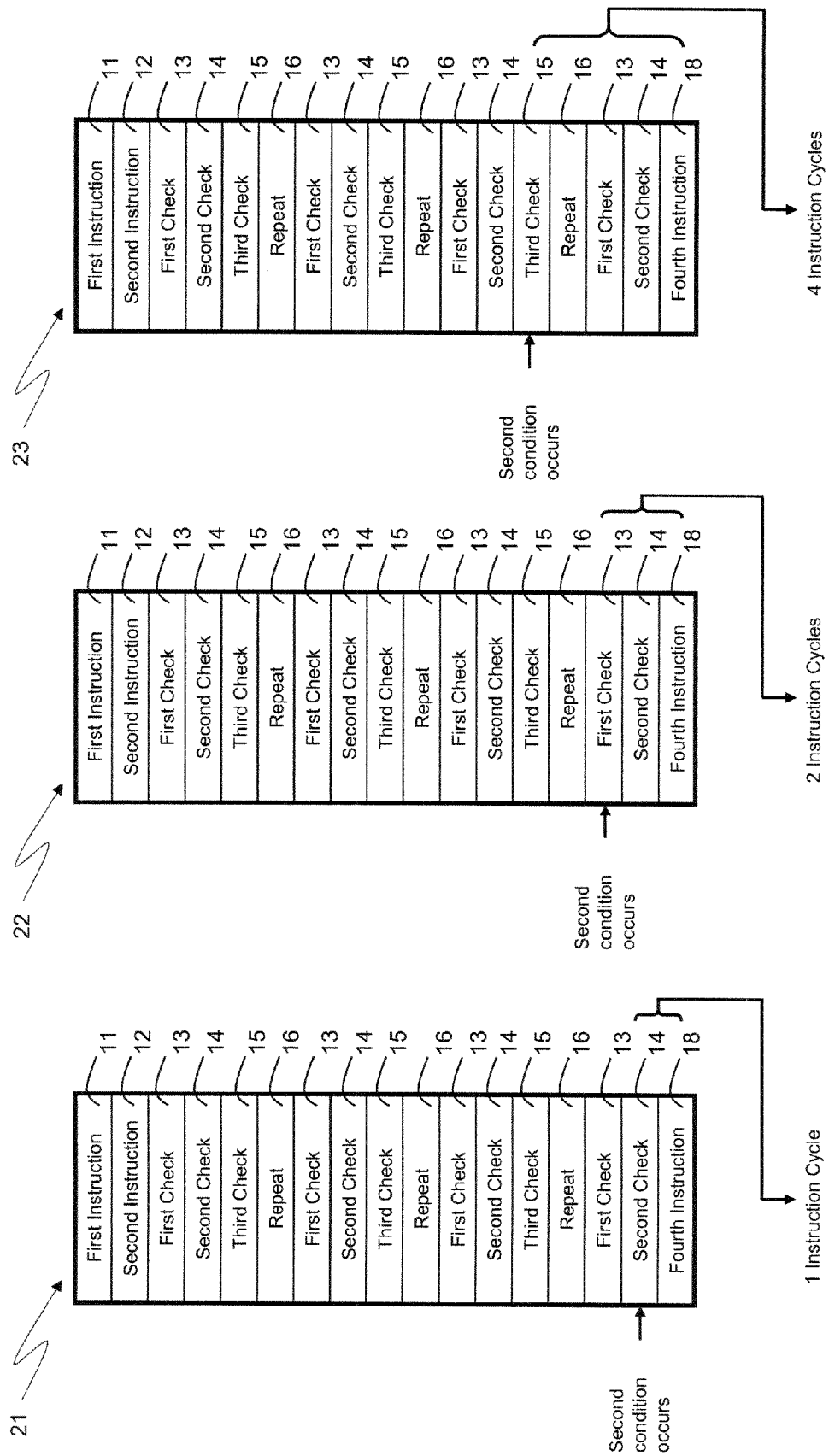
FIG. 2 shows three examples of instructions executed in accordance with the instruction execution logic in FIG. 1.

The following discussion is presented to enable a person skilled in the art to make and use the invention. Various modifications to the embodiments will be readily apparent to those skilled in the art, without departing from the scope of the present invention as claimed. Thus, the present invention is not intended to be limited to the embodiments shown, but is to be accorded the widest scope consistent with the principles and features disclosed herein and defined in the appended claims.

According to the present invention, there is provided a microprogrammable electronic device which, when it is in a wait state, unlike known microprogrammable devices which cyclically and continuously check each individual wait state exit condition, is configured to make a parallel check of a plurality of pre-set conditions.

More specifically, the microprogrammable electronic device according to the present invention comprises a code memory storing a software and/or firmware code comprising a plurality of instructions including a wait instruction, stores, i.e. comprises, an electronic table, and, when it is in a wait state, is configured to: load into the electronic table at least one wait state exit condition together with a code memory address of a corresponding instruction to be executed if said wait state exit condition occurs; execute said wait instruction, which, when executed, causes the microprogrammable electronic device to freeze the program counter and make a parallel check of different wait state exit conditions stored in the electronic table to detect whether one of said wait state exit conditions occurs; and if one of the wait state exit conditions stored in the electronic table occurs, execute the corresponding instruction stored in the code memory at the code memory address stored into the electronic table together with the wait state exit condition that has occurred.

In detail, the electronic table comprises a plurality of rows, each of which may be loaded with: a respective wait state exit condition; and a respective code memory address of a corresponding instruction to be executed when said respective wait state exit condition occurs.

Each row in the electronic table is preferably associated with a respective enabling flag, which can only assume two values: an "on" value indicating that the respective wait state exit condition in the row must actually be checked; and an "off" value indicating that the respective wait state exit condition in the row need not be checked.

Using the enabling flag: all the wait state exit conditions stored in the electronic table need not be checked every time; the wait state exit conditions that do not need checking need not be deleted; and the instructions for loading and reloading the wait state exit conditions into the electronic table are minimized.

Each row in the electronic table therefore conveniently also stores: the respective enabling flag; and a numeric code or index corresponding to the respective wait state exit condition to be checked; said numeric code or index being coded by a number of bits, which depends on the number of wait state exit conditions considered plausible.

Using the electronic table, i.e. a dedicated database table for storing the wait state exit conditions, all the wait state exit conditions in the table can be read (and therefore checked) simultaneously, whereas storing the wait state exit conditions in the code memory or data memory of the microprogrammable electronic device, only one wait state exit condition at a time can be read.

Figure 3:
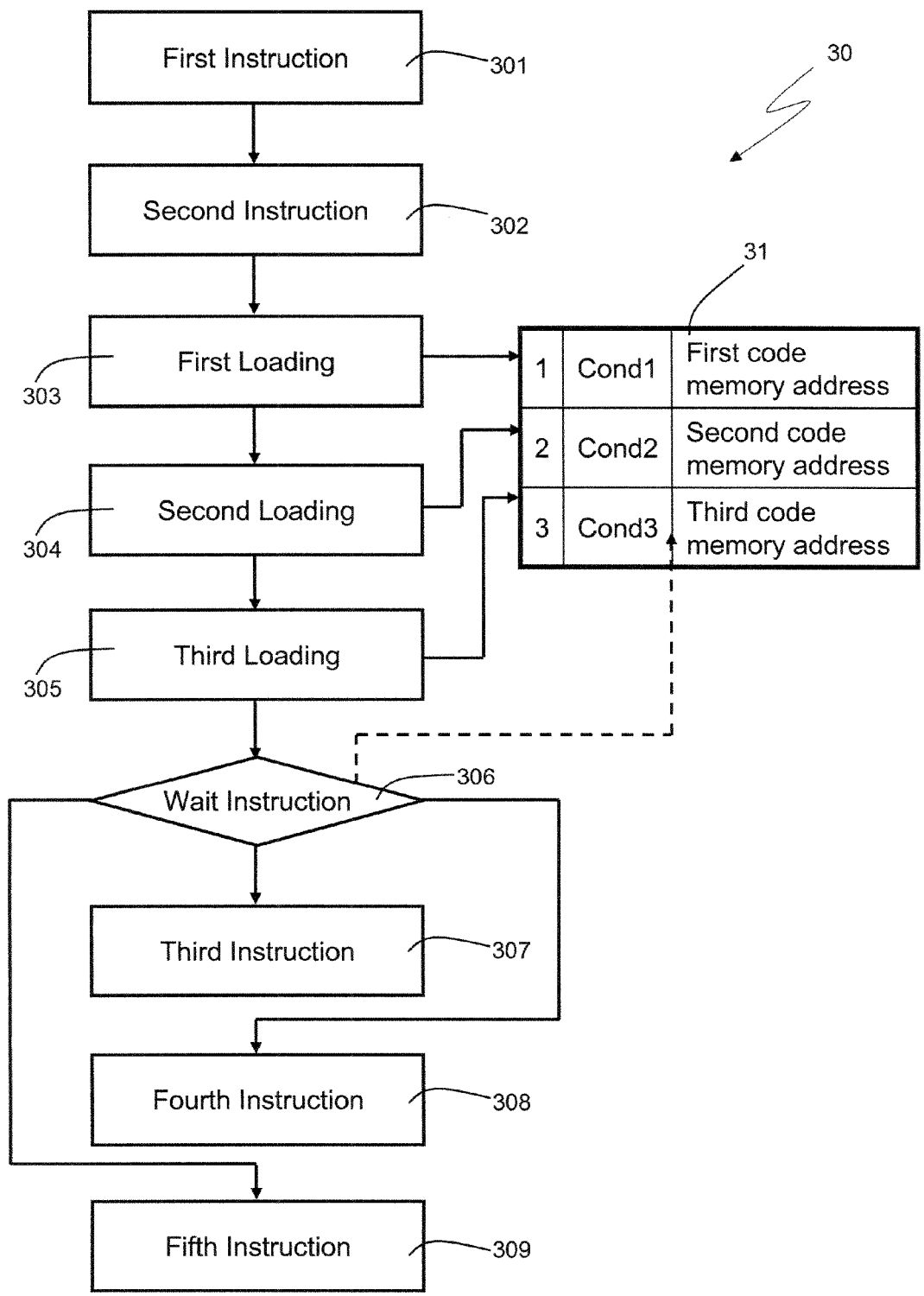
FIG. 3 shows a flow chart of an instruction execution logic of a microprogrammable device in accordance with the present invention and in the case of a three-exit wait state.

For a clearer understanding of the present invention, FIG. 3 shows, by way of example, a flow chart of an instruction execution logic of a microprogrammable device in accordance with the present invention and in the case of a three-exit wait state.

More specifically, the instruction execution logic, indicated by 30 in FIG. 3, comprises executing: a first instruction 301; a second instruction 302, after the execution of which the microprogrammable device enters into a wait state; a first loading 303 into an electronic table 31 of a first wait state exit condition, indicated by Cond1 in FIG. 3, and of a first code memory address of a third instruction 307 to be executed if said first wait state exit condition Cond1 occurs; a second loading 304 into the electronic table 31 of a second wait state exit condition, indicated by Cond2 in FIG. 3, and of a second code memory address of a fourth instruction 308 to be executed if said second wait state exit condition Cond2 occurs; a third loading 305 into the electronic table 31 of a third wait state exit condition, indicated by Cond3 in FIG. 3, and of a third code memory address of a fifth instruction 309 to be executed if said third wait state exit condition Cond3 occurs; a wait instruction 306 which, when executed by the microprogrammable electronic device, causes the microprogrammable electronic device to freeze, i.e. not update, the program counter, and to simultaneously check the wait state exit conditions Cond1, Cond2, Cond3 stored in the electronic table 31; said third instruction 307, if the first wait state exit condition Cond1 occurs; said fourth instruction 308, if the second wait state exit condition Cond2 occurs; said fifth instruction 309, if the third wait state exit condition Cond3 occurs.

In other words, by executing the wait instruction 306 and using the electronic table 31, the present invention provides for detecting a given wait state exit condition as soon as it occurs, so that, unlike known microprogrammable devices, the time interval between the occurrence of a wait state exit condition and execution of the corresponding instruction is constant.

Figure 4:
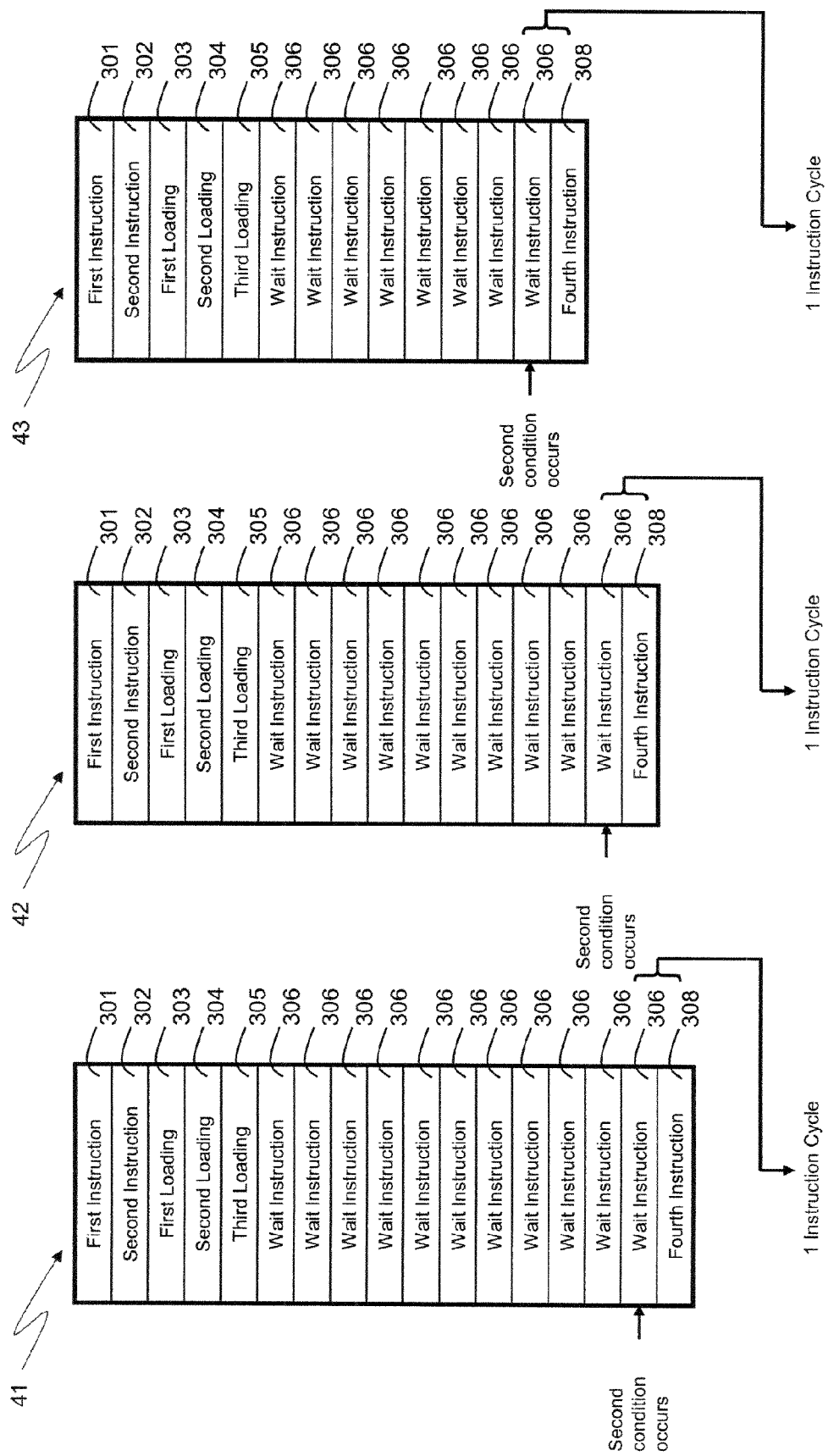
FIG. 4 shows three examples of instructions executed in accordance with the instruction execution logic in FIG. 3.

In connection with the above, FIG. 4 shows three examples, indicated by 41, 42 and 43, respectively, of instructions executed in accordance with the instruction execution logic 30 in FIG. 3.

More specifically, in the first example 41, the second wait state exit condition Cond2 occurs simultaneously with the execution of the wait instruction 306, so is therefore detected immediately, and the fourth instruction 308 is executed at the next instruction cycle.

In the first example 41, the time interval between the occurrence of the second wait state exit condition Cond2 and execution of the corresponding instruction, i.e. the fourth instruction 308, is therefore of one instruction cycle.

In the second example 42, the second wait state exit condition Cond2 again occurs simultaneously with the execution of the wait instruction 306, so is again detected immediately, and the fourth instruction 308 is executed at the next instruction cycle.

In the second example 42, the time interval between the occurrence of the second wait state exit condition Cond2 and execution of the fourth instruction 308 is therefore also of one instruction cycle.

Finally, in the third example 43, the second wait state exit condition Cond2 again occurs simultaneously with the execution of the wait instruction 306, so is again detected immediately, and the fourth instruction 308 is executed at the next instruction cycle.

In the third example 43, the time interval between the occurrence of the second wait state exit condition Cond2 and execution of the fourth instruction 308 is therefore also of one instruction cycle.

Therefore, as stated, and as shown in the examples 41, 42 and 43, according to the present invention, the time interval between occurrence of a wait state exit condition and execution of the corresponding instruction has a fixed length, i.e. is unaffected by jitter.

Moreover, the microprogrammable device according to the present invention preferably comprises, for each row in the electronic table, a respective checking unit configured to check the respective wait state exit condition stored in the row, i.e. to determine occurrence or not of the respective wait state exit condition stored in the row.

More specifically, each checking unit is configured: to acquire all the signals by which to determine occurrence of the wait state exit conditions; to acquire from a respective row in the electronic table a respective wait state exit condition stored in said respective row and to be checked; and if the enabling flag of the respective row assumes the "on" value, to supply an output signal indicating occurrence or not of the respective wait state exit condition.

The outputs of all the checking units are connected in input to a selector configured: if a single wait state exit condition has occurred, to determine the index of the occurred single wait state exit condition; if several wait state exit conditions have occurred, to solve the conflict by determining the index of the highest-priority occurred wait state exit condition; and to supply the index of the single or highest-priority wait state exit condition which has occurred to a multiplexer configured to retrieve from the electronic table, on the basis of the index supplied by the selector, the code memory address of the instruction corresponding to said single or highest-priority wait state exit condition which has occurred.

Figure 5:
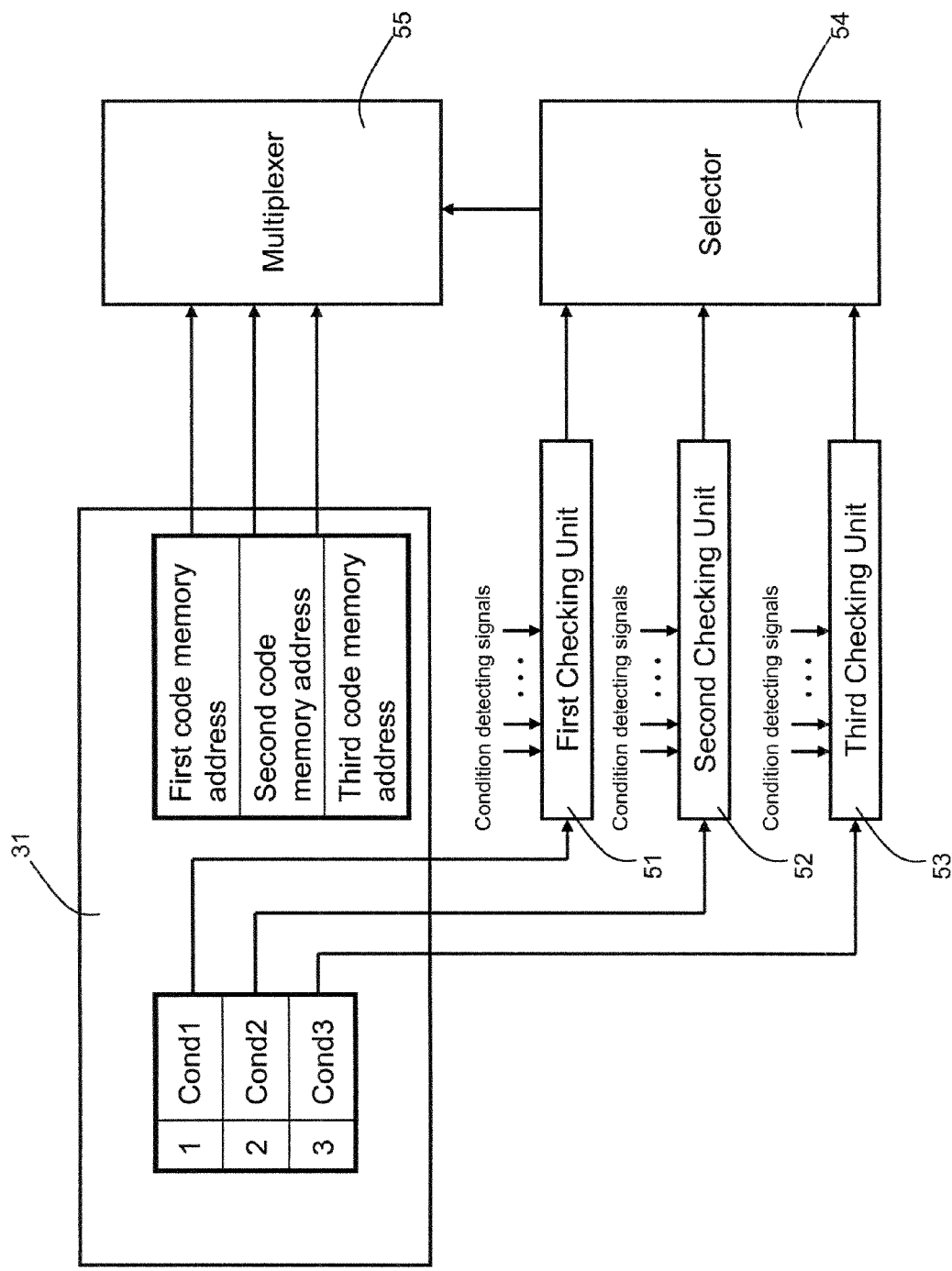
FIG. 5 shows an operating block diagram of a portion of a microprogrammable electronic device in accordance with the present invention.

For a clearer understanding of the present invention, in addition to FIGS. 3 and 4, FIG. 5 shows an operating block diagram illustrating a portion of an electronic microprogrammable device in accordance with the present invention, and in which the FIG. 3 component parts already described are indicated using the same reference numbers as in FIG. 3.

More specifically, FIG. 5 shows the electronic table 31, in which are stored: the first wait state exit condition Cond1 and the first code memory address of the third instruction 307 to be executed if the first wait state exit condition Cond1 occurs; the second wait state exit condition Cond2 and the second code memory address of the fourth instruction 308 to be executed if the second wait state exit condition Cond2 occurs; and the third condition Cond3 and the third code memory address of the fifth instruction 309 to be executed if the third wait state exit condition Cond3 occurs.

Moreover, the first wait state exit condition Cond1 is acquired by a first checking unit 51, which also acquires all the signals by which to determine occurrence of the wait state exit conditions Cond1, Cond2 and Cond3.

Likewise, the second wait state exit condition Cond2 and the third wait state exit condition Cond3 are acquired, respectively, by a second and third checking unit, indicated in FIG. 5 by 52 and 53, respectively, which also acquire all the signals by which to determine occurrence of the wait state exit conditions Cond1, Cond2 and Cond3.

The first, second and third checking unit 51, 52, 53 check the first, second and third wait state exit condition Cond1, Cond2, Cond3, respectively, and, if the enabling flag of the respective acquired wait state exit condition assumes the "on" value, each checking unit supplies a selector 54 with a respective signal indicating occurrence or not of the respective wait state exit condition.

The selector 54 then supplies the index of the occurred wait state exit condition, or, in the event of multiple occurred wait state exit conditions, the index of the highest-priority wait state exit condition, to a multiplexer 55, which, on the basis of the index supplied by the selector 54, retrieves from the electronic table 31 the code memory address of the instruction to be executed and corresponding to the occurred wait state exit condition.

Finally, on the basis of the code memory address retrieved from the electronic table 31 by the multiplexer 55, the microprogrammable electronic device updates the program counter and executes the corresponding instruction.

The advantages of the present invention are clear from the above description. In particular, it is important to note that, according to the present invention, when the microprogrammable electronic device is in a wait state, the time interval between occurrence of a wait state exit condition and execution of the corresponding instruction is fixed, i.e. no longer depends on the point at which the execution of the code is when the condition occurs.

Another advantage of the present invention is that, upon occurrence of a condition, execution of the code is directed accordingly within a predictable time interval.

Finally, it is clear that numerous modifications and variants can be made to the present invention, all falling within the scope of the invention, as defined in the appended claims.

What is claimed:

1. A microprogrammable electronic device comprising a code memory storing a plurality of instructions, at least one of said instructions, when executed by the microprogrammable electronic device, being such as to cause the microprogrammable electronic device to enter into a wait state associated with a plurality of predefined wait state exit conditions, said microprogrammable electronic device being characterized by being configured:

to load into an electronic table each of said predefined wait state exit conditions together with a corresponding code memory address of an instruction to be executed if the predefined wait state exit condition occurs;

when it is in said wait state, to execute a wait instruction stored in said code memory and which, when executed, is such as to cause the microprogrammable electronic device to check simultaneously said predefined wait state exit conditions loaded into said electronic table to detect if at least one of said predefined wait state exit conditions occurs; and if one of said checked predefined wait state exit conditions occurs, to exit from said wait state and to execute the instruction stored in the code memory at the code memory address loaded into the electronic table together with said predefined wait state exit condition that has occurred.

2. The microprogrammable electronic device of claim 1, further configured, when it executes an instruction, to update a program counter to indicate the code memory address of an instruction to be executed after the currently executed instruction;

said wait instruction, when executed by the microprogrammable electronic device, also being such as to cause the microprogrammable electronic device not to update said program counter.

3. The microprogrammable electronic device according to claim 1, comprising, for each predefined wait state exit condition loaded into said electronic table, a corresponding checking unit connected to the electronic table and configured to:

acquire the predefined wait state exit condition from the electronic table;

acquire at least one signal by which to determine occurrence or not of the acquired predefined wait state exit condition;

determine occurrence or not of the acquired predefined wait state exit condition on the basis of the acquired signal; and supply an output signal indicating occurrence or not of the acquired predefined wait state exit condition.

4. The microprogrammable electronic device of claim 3, further comprising a selector connected to said checking units, and a multiplexer connected to said selector, said selector being configured:

to acquire the output signals from said checking units; and, on the basis of the acquired output signals, to supply the multiplexer with an index indicating an occurring predefined wait state exit condition;

said multiplexer being configured on the basis of said index supplied by the selector, to retrieve from the electronic table and to output the code memory address loaded into the electronic table together with said occurring predefined wait state exit condition.

5. The microprogrammable electronic device of claim 4, further configured to update said program counter on the basis of the address outputted by the multiplexer.

6. The microprogrammable electronic device according to claim 1, comprising a memory distinct from the code memory and configured to implement said electronic table.

7. A software and/or firmware product comprising instructions which, when executed by a microprogrammable electronic device, cause said microprogrammable electronic device to become configured as the microprogrammable electronic device according to claim 1.

8. Electronic checking means intended for a microprogrammable electronic device and configured as the checking units of claim 3.

* * * * *